Patented Oct. 3, 1922.

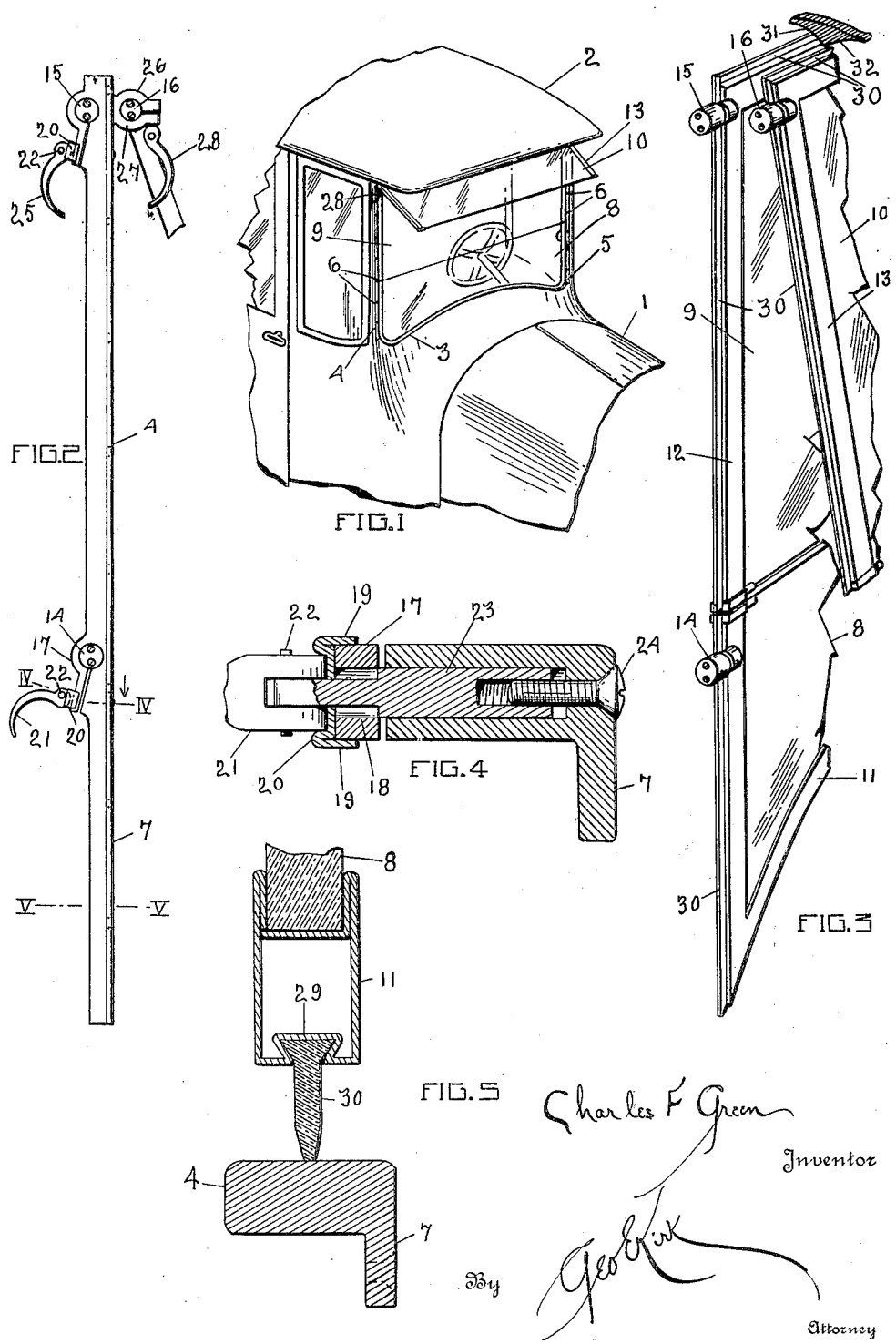

1,430,897

UNITED STATES PATENT OFFICE.

CHARLES F. GREEN, OF TOLEDO, OHIO, ASSIGNOR TO THE WILLYS-OVERLAND CO., OF TOLEDO, OHIO, A CORPORATION OF OHIO.

CLOSED-CAR STORM SHIELD.

Application filed June 5, 1916. Serial No. 101,662.

*To all whom it may concern:*

Be it known that I, CHARLES F. GREEN, a citizen of the United States of America, residing at Toledo, Lucas County, Ohio, have invented new and useful Closed-Car Storm Shields, of which the following is a specification.

This invention relates to window structures and the mounting thereof.

This invention has utility when incorporated in storm shields, especially for motor vehicles of the closed car or winter body type.

Referring to the drawings:

Fig. 1 is a perspective view, with parts broken away, of an embodiment of the invention as applied to a motor vehicle front or storm shield;

Fig. 2 is a side elevation of the storm shield device of Fig. 1;

Fig. 3 is a fragmentary perspective view of the panels of the storm shield;

Fig. 4 is a section on the line IV—IV Fig. 2; and

Fig. 5 is a section on the line V—V Fig. 2.

The motor vehicle 1 has the closed top 2 provided with the front opening 3 in the opposite sides of which may be mounted the angle columns 4, 5, by the screws 6 through the angle 7 of the columns 4, 5. These overlapping angles 7 stiffen the columns and permit of a sightly snug closure for the front opening with the absence of accuracy for preliminary fitting. Accordingly, the closure for this front opening may be assembled as a unit and brought to the completed body as such unit and conveniently readily assembled therein.

Between the columns 4, 5, may be mounted the transparency or glass panel members including the lower glass 8, the upper glass 9 and the rain shield glass 10. The glass 8 is mounted in the frame 11 having the upper side open. The glass 9 is mounted in the frame 12 having the lower side open, and the rain shield 10 is mounted in the frame 13 having the lower side open. The frame 11 is provided with the trunnions 14. The frame 12 is provided with the trunnions 15 and the frame 13 is provided with the trunnions 16.

Frictionally embracing the trunnion 14 is the yieldable arm 17 having the opening 18 therethrough. This yieldable arm 17 is embraced by the cheeks 19 of the washer 20 which is non-rotatively engaged by the cam arm 21 connected by the pivot pin 22 to the stem 23 held in the column by the adjustable screw 24. Accordingly, rocking of this arm 21 may flex this yieldable arm 17 into firmly gripping engagement with the trunnion 14 and thereby positively lock the frame 11 in the adjusted vertical or inclined position desired.

This yieldable arm 17 extending in the general direction of the column may be flexed independently of the column strains and be effective for firmly gripping. Similarly the trunnion 15 may be engaged by the cam arm 25. The trunnion 16 disposed between the pair of yieldable arms 26, 27, may be similarly operated by the cam arm 28, and thereby frictionally hold the frame 13 and rain shield panel 10 in such inclined or adjusted position as may be found desirable.

The frames 11, 12, 13, have in their peripheral or outer edges the broadened base or dove-tail channel 29 for anchoring the flexible packing or weather resisting rubber strip 30. This packing will coact with the cowl of the car on the lower side of the lower panel and with the inner face of the angle columns on the upright sides of the panels. The upper edges of the panels will coact for weather packing clearance with the curved portions 31, 32, in the upper side of the front opening of the vehicle body 2. Accordingly, with the panel frames coacting with the sides of the opening there is effective packing against incoming weather.

What is claimed and it is desired to secure by United States Letters Patent is:

1. In a device of the character described, the combination of a column having a yieldable arm and a bearing formed jointly in said arm and said column, a shield frame having a trunnion engaging in said bearing, said column having a socket opposite said arm, a post slidably mounted in said socket, a cam lever pivotally mounted on one end of said post for engaging said arm and an adjusting screw passing through said column and threaded into the opposite end of said post.

2. In a device of the character described, the combination of a column having a split trunnion bearing, one side of said bearing comprising a yieldable arm extending approximately parallel with said column, a shield frame having a trunnion for engaging in said bearing, said column being provided with a socket arranged opposite said arm, a post in said socket extending through said arm, a lever having a cam face pivoted on one end of said post to engage said arm, and an adjusting screw threaded in the opposite end of said post and extending through the bottom of the socket in said column.

In witness whereof I affix my signature.

CHARLES F. GREEN.